(12) United States Patent
Olsson

(10) Patent No.: US 6,382,461 B1
(45) Date of Patent: May 7, 2002

(54) APPARATUS AND METHOD FOR METERING A PARTICULATE SUBSTANCE

(75) Inventor: Bert-Åke Olsson, Strängnäs (SE)

(73) Assignee: AstraZeneca AB, Sodertalje (SE)

( * ) Notice: Subject to any disclaimer, the term of this patent is extended or adjusted under 35 U.S.C. 154(b) by 0 days.

(21) Appl. No.: 08/913,980

(22) PCT Filed: Aug. 14, 1997

(86) PCT No.: PCT/SE97/01347

§ 371 Date: Sep. 25, 1997

§ 102(e) Date: Sep. 25, 1997

(87) PCT Pub. No.: WO98/08065

PCT Pub. Date: Feb. 26, 1998

(30) Foreign Application Priority Data

Aug. 23, 1996 (SE) ............................................. 9603063

(51) Int. Cl.⁷ ............................. G01F 11/26; B67D 5/06
(52) U.S. Cl. .......................... 222/1; 222/456; 222/426; 222/437; 222/438; 222/170
(58) Field of Search ................................ 222/170, 426, 222/434, 437, 438, 456, 457

(56) References Cited

U.S. PATENT DOCUMENTS 2,730,285 A * 1/1956 Lazzery ................. 222/170 X
3,333,745 A * 8/1967 Hartley et al. .......... 222/456 X
4,461,400 A * 7/1984 Kempf et al. ............ 222/456 X
4,613,064 A 9/1986 Meyer et al. ................ 222/456
5,709,319 A * 1/1998 Yao ......................... 222/170 X

FOREIGN PATENT DOCUMENTS

| EP | 0269285 | 6/1988 |
|----|---------|--------|
| GB | 208641 | 12/1923 |
| GB | 2113182 | 8/1983 |

* cited by examiner

Primary Examiner—Henry C. Yuen
Assistant Examiner—Stephanie Willatt
(74) Attorney, Agent, or Firm—White & Case LLP

(57) ABSTRACT

A method and device are disclosed for metering a predetermined amount of a particulate substance in a reliable and exact manner. The claimed invention avoids crushing or packing the material to be metered, and can be utilized with fine particulate substances with poor flow properties such as agglomerates as well as with coarser granulates. The substance to be metered is gravity-fed by a tumbling reservoir and inlet through an unbroken and uninterrupted inflow path which comprises two parts, one which is coaxial with the rotational axis, and a second which is inclined relative to the rotational axis. After passage through the inflow path, the substance enters the metering chamber which accurately and uniformly measures the desired quantity of substance, which then exits through the outflow path. The design of the device prevents inaccurate metering through overfilling or premature emptying of the metering chamber.

22 Claims, 2 Drawing Sheets

APPARATUS AND METHOD FOR METERING A PARTICULATE SUBSTANCE

BACKGROUND OF THE INVENTION

The present invention relates to a device for and a method of metering a predetermined amount of a particulate substance and to a metering apparatus comprising two or more of such metering devices. More specifically, the present invention is directed to the metering or dosing of granular or spheronized substances having poor flowability. The present invention is especially, but not exclusively, adapted to meter pressure-sensitive particulate substances, such as in the metering of a predetermined amount of a particulate pharmaceutical substance for use in a dry powder inhaler.

Powders having very small particle sizes (micronized powders) are commonly used in inhalation therapy. Such powders are often light and dusty, and therefore cause handling problems. Furthermore, such powders have very poor free-flowing properties which often make the handling and precise metering thereof problematic.

It is known to form such powders into larger particles (agglomerates) in order to enhance flowability. WO-A-95/09615 discloses one method of forming spheronized agglomerates which are capable of being broken down during inhalation to provide a fine powder. Such agglomerates consisting of more dense and compact particles present, however, another disadvantage in that the agglomerates are relatively pressure sensitive. This makes it difficult to meter the agglomerates without damaging the agglomerates and/or creating larger agglomerates, thereby reducing the flowability and hence the preconditions for exact metering.

Thus, there is a need for a technique which permits a more exact metering of fine particulate substances, in particular agglomerates. Exact metering is especially important in the case of handling and distributing powders containing medicaments where stipulated volume or weight tolerances must be complied with. One example is the filling of dry powder inhalers, such as inhalers of the kind disclosed in EP-B-0237507.

GB-A-2113182 discloses a metering device for metering granular materials. The disclosed metering device is, however, adapted to meter free-flowing granular materials, such as granular fertilisers, and not powders having very small particle sizes with poor flowability. The disclosed metering device includes a reservoir in the form of an elongate tube, and, whilst suited to the delivery of free-flowing granular materials to the metering mechanism, would be unable reliably to deliver powders having very small particle sizes to the metering mechanism, since the head of powder in the reservoir above the metering mechanism would result in physical bridges of the powder being formed in the reservoir, thereby preventing the free flow of powder to the metering mechanism.

It is thus a general aim of the present invention to provide a device for and a method of metering a particulate substance in a reliable and exact manner.

A further aim of the present invention is to provide a device for and a method of metering pressure-sensitive particulate substances, such as agglomerates, in a manner which avoids damaging the particulate substances.

Another aim of the present invention is to provide a device for and a method of metering particulate substances which can be performed at high speed.

SUMMARY OF THE INVENTION

Accordingly, the present invention provides a metering device for metering a predetermined amount of a particulate substance, comprising: a body member defining a metering chamber; an inflow path having an inlet and leading to the metering chamber, wherein the inflow path is unbroken, rotatable about an axis inclined relative to the horizontal and includes a first part which is co-axial with the rotational axis and a second part which is inclined relative to the rotational axis so as to be inclined downwards in a loading state and upwards in an emptying state, whereby the inflow path in use guides a gravity-induced flow of particulate substance into the metering chamber in the loading state and provides a gravitational inlet lock which prevents the flow of particulate substance into the metering chamber in the emptying state; an outflow path having an outlet and leading from the metering chamber, wherein the outflow path includes flow control means which prevents the flow of particulate substance out of the metering chamber in the loading state, but admits the flow of particulate substance out of the metering chamber in the emptying state; and a reservoir leading to the inlet of the inflow path, wherein the reservoir is rotatable and configured so as in use to rotate together with and provide particulate substance to the inflow path; characterized in that the reservoir is further configured such that on rotation a tumbling effect is achieved at the inlet of the inflow path for every volume of particulate substance containable therein.

The metering device is adapted to meter a predetermined amount of a particulate substance, either as a predetermined volume or a predetermined weight. In this application, it will be understood that the term state transition encompasses both a transition from the loading state to the emptying state and from the emptying state to the loading state.

A feature of the metering device is that the inflow path to the metering chamber is unbroken. In this application, it will be understood that the term unbroken is used to mean that no mechanical valve members or the like are disposed in the inflow path. Thus, damage to particulate substance present in the inflow path can be avoided, and the metering device is particularly suited to the metering of pressure-sensitive particulate substances such as powder agglomerates. The use of mechanical valve members downstream of the metering chamber is, however, not excluded so long as such valve members do not block or disrupt the outflow path. An example thereof will be described hereinbelow.

Another feature of the metering device is the provision of a gravitational inlet lock upstream of the metering chamber; that is, a locking function which results from the gravitational force acting on the particulate substance present in the inflow path. As a result, it is possible, even after filling of the metering chamber has been completed, to maintain unbroken contact between the particulate substance present in the inflow path and the metered amount of particulate substance present within the metering chamber. Thus, no mechanical valve member or the like is required at the inlet to the metering chamber to prevent the further inflow of particulate substance after filling has been completed.

In addition to the above-described gravitational inlet lock, the outflow path also includes flow control means which prevents the flow of particulate substance from the metering chamber in the loading state, but admits such outflow in the emptying state. As a consequence of the fact that the metering chamber, and the outflow path downstream of the metering chamber, will normally be empty during the filling step, the flow control means down stream of the metering chamber may, in contrast to the inlet lock, be in the form of a movable mechanical valve member or the like, the operation of which is controlled in a suitable manner in response to each state transition. However, in a preferred embodiment the metering device of the present invention includes a gravitational outlet lock downstream of the metering chamber. In order to provide a gravitational outlet lock, the state transition further involves a rotation of the outflow path so as to prevent the flow of particulate substance from the metering chamber in the loading state, but admit such outflow in the emptying state.

The flow paths preferably define a channel which extends through the body member. However, the flow paths may also be in the form of non-closed surfaces which support and guide the particulate substance, provided that such surfaces can be inclination-shifted for accomplishing the gravitational locking.

The present invention also provides a method of metering a predetermined amount of a particulate substance, comprising the steps of providing a metering device for metering a predetermined amount of a particulate substance, the metering device comprising a body member defining a metering chamber, an inflow path having an inlet and leading to the metering chamber, wherein the inflow path is unbroken, rotatable about an axis inclined relative to the horizontal and includes a first part which is co-axial with the rotational axis and a second part which is inclined relative to the rotational axis so as to be inclined downwards in a loading state and upwards in an emptying state, an outflow path having an outlet and leading from the metering chamber and a reservoir leading to the inlet of the inflow path, wherein the reservoir is rotatable about the rotational axis and configured so as in use to rotate together with and provide particulate substance to the inflow path; providing particulate substance into the reservoir; rotating the inflow path so as to incline the second part thereof downwards and guide a gravity-induced flow of the particulate substance therethrough so as to fill the metering chamber; preventing a gravity-induced flow of the particulate substance out of the metering chamber during the filling step; rotating the inflow path so as to incline the second part thereof upwards and thereby provide a gravitational inlet lock which prevents the further flow of particulate substance into the metering chamber; and emptying the metering chamber while particulate substance is prevented from flowing into the metering chamber; characterized in that the reservoir is further configured such that on rotation a tumbling effect is achieved at the inlet of the inflow path for every volume of particulate substance containable therein.

The present invention further provides a metering apparatus for metering a predetermined amount of a particulate substance, comprising at least one metering device comprising a body member defining a metering chamber, an inflow path having an inlet and leading to the metering chamber, wherein the inflow path is unbroken, rotatable about an axis inclined relative to the horizontal and includes a first part which is rotatable about the rotational axis and a second part which is inclined relative to the rotational axis so as to be inclined downwards in a loading state and upwards in an emptying state, whereby the inflow path in use guides a gravity-induced flow of particulate substance into the metering chamber in the loading state and provides a gravitational inlet lock which prevents the flow of particulate substance into the metering chamber in the emptying state, and an outflow path having an outlet and including flow control means which prevents the flow of particulate substance out of the metering chamber in the loading state, but admits the flow of particulate substance out of the metering chamber in the emptying state; characterized in that the metering apparatus further comprises a rotatable wheel having two or more metering devices mounted thereon in circumferentially spaced positions with a common rotational axis.

An advantage of disposing a plurality of metering devices on a rotatable wheel is that one metering device can be loaded at a loading station, while another, previously filled metering device can be emptied simultaneously at an emptying station. In a preferred embodiment the metering apparatus comprises at least two metering devices disposed diametrically opposite each other on the rotating wheel, such that when one of the at least two metering devices is in the loading state another is in the emptying state.

When using only one metering device, the outlet thereof can be held in a substantially fixed position in a horizontal plane during a state transition. As a result, the flow of particulate substance from the metering device is focused. In contrast, in the case of a rotating wheel provided with a plurality of metering devices which follow a circular path, the outlet of each metering device is not stationary during a state transition. In order to avoid the premature flow of particulate substance from the outlets during rotation from the loading state to the emptying state, each metering device preferably comprises an individually controllable valve member, which is movable between a closed position for closing the outlet of the metering device in the loading state and an open position for opening the outlet of the metering device in the emptying state. The operation of such valve members may be controlled by a cam-type arrangement which is configured to operate in response to the rotation of the rotatable wheel.

BRIEF DESCRIPTION OF THE DRAWINGS

Preferred embodiments of the present invention will now be described hereinbelow by way of example only with reference to the accompanying drawings, in which.

DESCRIPTION OF THE PREFERRED EMBODIMENTS

Figure 1:
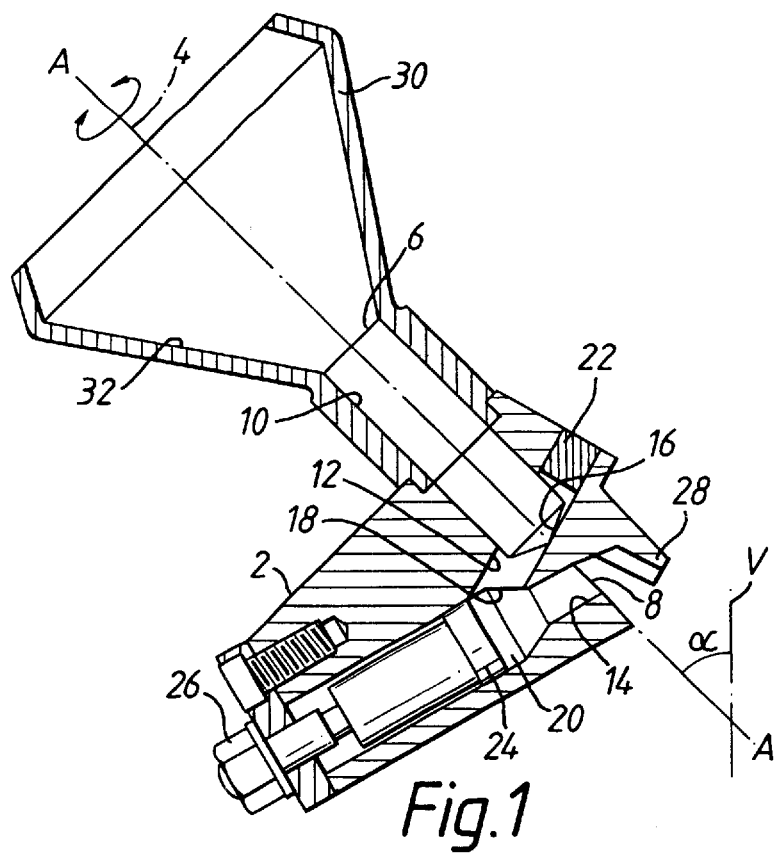
FIG. 1 illustrates a vertical sectional view of a metering device, illustrated in the loading state, in accordance with a preferred embodiment of the present invention.
Figure 2:
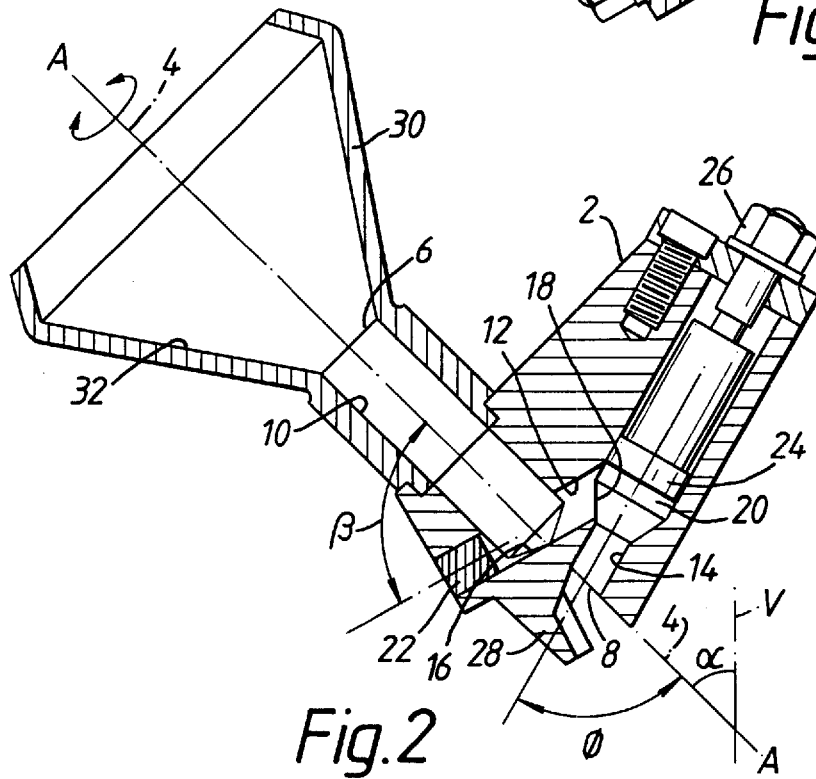
FIG. 2 illustrates a vertical sectional view of the metering device of FIG. 1 in the emptying state.

FIGS. 1 and 2 illustrate a metering device in accordance with a preferred embodiment of the present invention. The metering device is typically used for the filling of dry powder inhalers with a predetermined amount (referred to as a dose hereinbelow) of a pharmaceutical substance in granular or spheronized form. The metering device is preferably made of stainless steel.

The metering device comprises a body member 2 which in use is reciprocatingly rotated through 180° about an inclined rotational axis 4 between a loading state as illustrated in FIG. 1, and an emptying state as illustrated in FIG. 2. The rotational axis 4 is inclined by an angle $\alpha$ of about 45° relative to the vertical V, but it will be understood that other inclinations could be employed. Although the body member 2 is reciprocatingly rotated in this preferred embodiment, it will be understood that the metering device could also equally be operated by rotating the body member 2 in a single sense.

The body member 2 includes a flow path extending therethrough from an inlet 6 to an outlet 8 and a metering chamber 9 in communication with the flow path. The flow path is formed by three bored channels, namely a first channel 10, a second, intermediate channel 12 and a third channel 14. The three channels 10, 12 and 14 are always interconnected; that is, no valve member or the like obturates the particulate substance guided through the flow path.

The first and second channels 10, 12 together form an inflow path from the inlet 6 to the metering chamber 9, and the third channel 14 forms an outflow path from the metering chamber 9 to the outlet 8. In this embodiment the metering chamber 9 is part of the third channel 14.

The first channel 10 extends downwards from the inlet 6 and is co-axial with the rotational axis 4.

Thus, the inclination of the first channel 10 is constant in time and unaffected by a state transition.

The second channel 12 forms a gravitational lock upstream of the metering chamber 9 and extends from a lower portion 16 of the first channel 10 to an opening 18 to the metering chamber 9. The second channel 12 extends at an angle $\beta$ relative to the rotational axis 4. The angles $\alpha$ and $\beta$ are so chosen that the second channel 12 is not directed in a horizontal plane in either the loading or emptying states as illustrated in FIGS. 1 and 2. More specifically, the second channel 12 is inclined downwards in the loading state for permitting gravitational flow into the metering chamber 9, and upwards in the emptying state for preventing gravitational flow into the metering chamber 9. Reference sign 22 designates a seal inserted in an outer end of the second channel 12.

The third channel 14 forms a gravitational lock downstream of the metering chamber 9, and extends from the metering chamber 9 to the outlet 8. The third channel 14 extends at an angle $\phi$ relative to the rotational axis 4. The angles $\alpha$ and $\phi$ are so chosen that in the loading state as illustrated in FIG. 1 the outflow path defined by the third channel 14 is directed upwards so as to prevent gravitational flow from the metering chamber 9 during the filling thereof, and in the emptying state as illustrated in FIG. 2 the outflow path defined by the third channel 14 is directed downwards for admitting and assisting gravitational flow from the metering chamber 9 of a dose of the particulate substance.

The body member 2 further includes an adjustable plunger 24 disposed inside the third channel 14 on the side of the metering chamber 9 facing away from the outlet 8 so as to provide for volume adjustment of the metering chamber 9. The plunger 24 is longitudinally positionable by an adjustment means 26 in order to set the internal volume of the metering chamber 9, and thus the volume to be filled in the loading state. The position of the plunger 24 may be manually adjustable by a nut and thread arrangement as illustrated in FIGS. 1 and 2, or optionally by a stepper motor or the like (not illustrated). In a preferred embodiment a feedback-type control arrangement could be incorporated, wherein the weight of a dose dispensed from the outlet 8 is measured, and a corresponding signal is used as a feedback signal for setting the internal volume of the metering chamber 9 at a desired value.

In use, in the loading state as illustrated in FIG. 1, particulate substance flows through the inflow path formed by the first and second channels 10, 12 under the action of gravity and fills up the volume of the metering chamber 9. The extent to which the third channel 14 is filled during the filling step is dependent upon the inclination and the length of the third channel 14, the flowability of the particulate substance and the pressure resulting from the weight of the particulate substance present within the flow path upstream of the metering chamber 9. Preferably, these parameters are so chosen that no overflow will take place from the outlet 8 during the loading step.

When the body member 2 is subsequently rotated through 180° to the emptying state as illustrated in FIG. 2, the dose present within the metering chamber 9 and the now downwardly-inclined third channel 14 flows out through the outlet 8 under the action of gravity. During the emptying step, particulate substance is prevented from flowing into the metering chamber 9 because the second channel 12 is inclined upwards in the emptying state; that is, the inflow path is gravitationally locked. It is important to note that no valve member or the like which could damage the particulate substance obturates the flow path.

As will be seen from FIGS. 1 and 2, the position of the outlet 8 in a horizontal plane is substantially unaffected by a state transition. This is due to the fact that the outlet 8 is co-axial with the rotational axis 4. In order to guide the outflow essentially in a vertical direction, for example into an inhaler (not illustrated) located below the outlet 8, the body member 2 is provided with a lug-shaped guide member 28.

The metering device further comprises a reservoir 30 having a flow-guiding surface 32 to the inlet 6 of the inflow path. In this embodiment the reservoir 30 takes the form of a hollow, truncated cone which is co-axial with the rotational axis 4 and is fixedly attached to the body member 2 in order to rotate therewith. The particulate substance to be metered is fed into the reservoir 30, preferably intermittently, so as to maintain a predetermined level within the reservoir 30. Rotation of the reservoir 30 accomplishes a tumbling effect, that is, a translational movement, of the particulate substance therein, thereby preventing the particulate substance from forming a physical bridge which could disturb or block the flow into the metering chamber 9.

Figure 3:
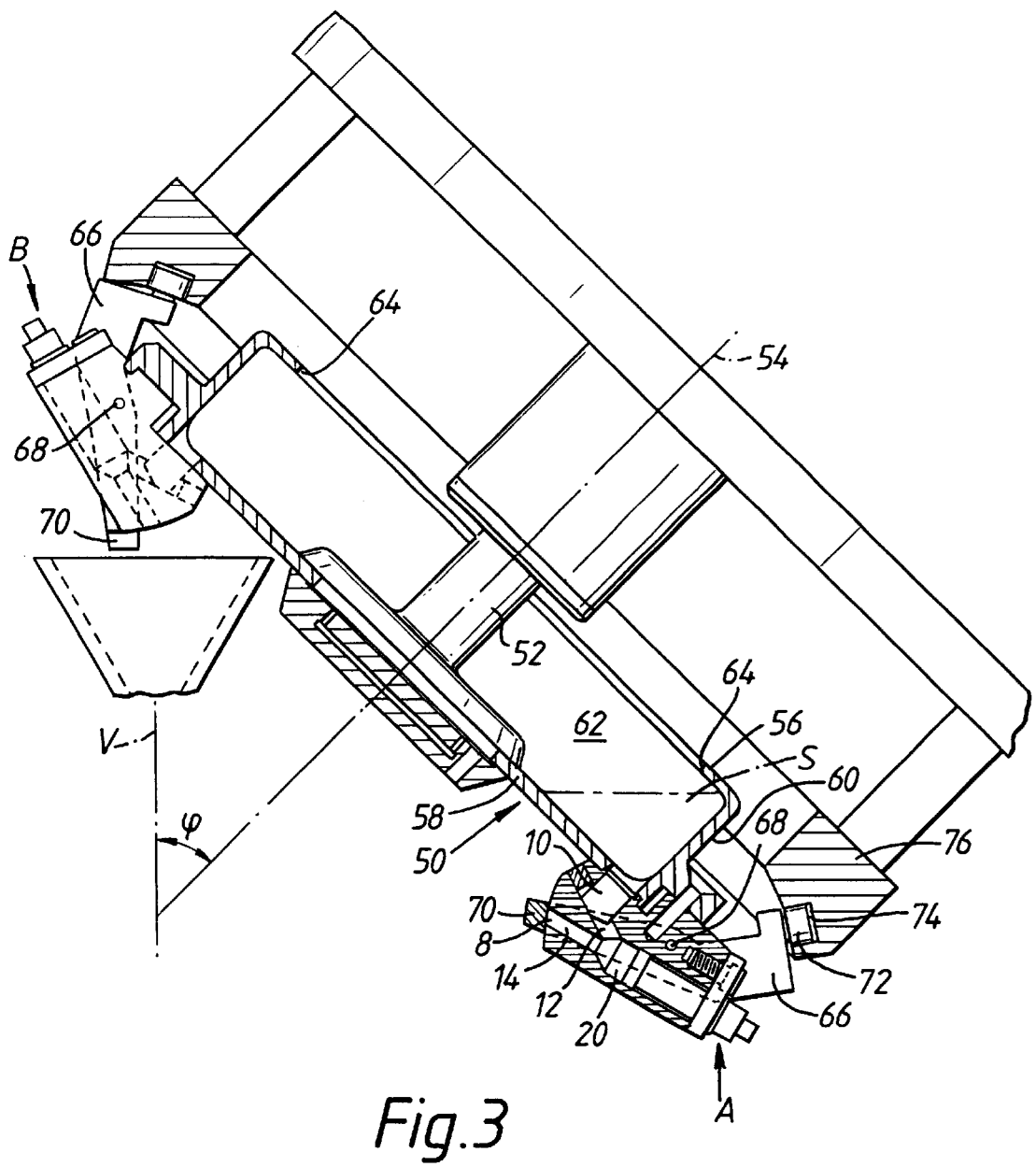
FIG. 3 illustrates a schematic vertical sectional view of a metering apparatus in accordance with another preferred embodiment of the present invention, illustrated with one metering device in the loading state and another metering device in the emptying state.

FIG. 3 illustrates a metering apparatus provided with a plurality of metering devices A, B of the kind as described in relation to FIGS. 1 and 2. Components of the metering devices A, B which have already been described in connection with the metering device of FIGS. 1 and 2 will be designated with the same reference signs, and a description of the construction and operation thereof will not be repeated.

The metering apparatus comprises a rotatable wheel 50 which is supported by a hub 52 and arranged to perform a stepwise, one-directional rotational movement about a rotational axis 54. The rotational axis 54 is inclined by an angle $\Phi$ of about 45° relative to the vertical V, but it will be understood that other inclinations could be employed. The rotatable wheel 50 comprises two opposite main walls 56, 58 and a peripheral wall 60 interconnecting the same. The walls 56, 58, 60 define an internal volume 62 for receiving particulate substance S, which substance S is fed in through an opening 64 provided in the upper main wall 56.

The metering apparatus further comprises first and second metering devices A, B of the kind as described in relation to FIGS. 1 and 2 mounted on the rotatable wheel 50 in diametrically opposite positions. In FIG. 3, the rotatable wheel 50 is illustrated in a position where the first metering device A is in a loading state and the second metering device B is in an emptying state. The operation of the metering devices A, B is essentially the same as the operation of the metering device as described in relation to FIGS. 1 and 2. Thus, the metering devices A, B are repeatedly shifted between a loading state and an emptying state, without requiring any valve members which could damage the particulate substance. However, whereas in the metering device of FIGS. 1 and 2 the rotational axis 4 extends through the metering device and is co-axial with the first channel 10, the metering devices A, B of the metering apparatus have a common rotational axis, namely the rotational axis 54 of the rotatable wheel 50.

Although the metering apparatus of this embodiment includes only two metering devices A, B, it will be appreciated that the rotatable wheel 50 may support additional metering devices. Typically, the rotatable wheel 50 may support six circumferentially and symmetrically spaced metering devices, such that in a given rotational position of the rotatable wheel 50, a first device is in the loading state at a loading station, second and third loaded devices are in the process of being rotated towards an emptying station, a fourth device is in the emptying state at the emptying station, and fifth and sixth empty devices are in the process of being rotated towards the loading station.

There is a further difference between the metering device as described in relation to FIGS. 1 and 2, and the metering devices A, B of the metering apparatus. In the former the position of the outlet 8 is substantially unaffected by a state transition, whereas in the latter the outlet 8 is moved along a circular path during a state transition. Therefore, the particulate substance present in a filled metering chamber 9 of one of the metering devices A, B leaving the loading station may fall out through the outlet 8, in part or completely before the respective metering device A, B has reached the emptying station. In order to prevent such premature emptying of the metering devices A, B, the metering devices A, B are each provided with a mechanical outlet locking member in the form of a controllable valve arrangement. Each valve arrangement comprises a pivotable arm 66 having a valve member 70 at one end and a cam follower 72 in the form of a roller at the other end. The pivot axis of the arm 66 is designated by reference sign 68. Each cam follower 72 is guided along a circumferential groove 74 formed in a stationary ring 76 and provides a guiding cam surface for the cam follower 72. As illustrated in FIG. 3, the radius of the circumferential groove 74 is somewhat larger in the loading state than in the emptying state. As a result, the angular position of the arms 66 will be shifted during a state transition. More specifically, the radius of the cam groove 74 is chosen such that the valve member 70 will be in the closed position in the loading state and along the path towards the emptying state, in order to close the outlet 8, as illustrated by metering device A. In the emptying state, the valve member 70 will be in the opened position, admitting the flow of particulate substance from the outlet 8, as illustrated by metering device B.

It will be understood that a mechanical valve member may be used in the metering device of FIGS. 1 and 2. In fact, it will be appreciated that the gravitational outlet lock formed by the third channel 14 in the metering device of FIGS. 1 and 2 may be replaced by a mechanical valve mechanism which repeatedly opens and closes the outlet 8.

Finally, it will be appreciated by a person skilled in the art that the present invention is not limited to the described embodiments but may be modified in many different ways within the scope of the invention as defined in the appended claims.

What is claimed is:

1. A metering device for metering a predetermined amount of a particulate substance, comprising:
   a body member (2) defining a metering chamber (9);
   an inflow path having an inlet (6) and leading to the metering chamber (9), wherein the inflow path is unbroken, rotatable about an axis (4) inclined relative to the horizontal and includes a first part (10) which is co-axial with the rotational axis (4) and a second part (12) which is inclined relative to the rotational axis (4) so as to be inclined downwards in a loading state and upwards in an emptying state, whereby the inflow path in use guides a gravity-induced flow of particulate substance into the metering chamber (9) in the loading state and provides a gravitational inlet lock which prevents the flow of particulate substance into the metering chamber (9) in the emptying state, wherein there is an absence of obstructing means in the metering chamber;
   an outflow path having an outlet (8) and leading from the metering chamber (9), wherein the outflow path includes flow control means which prevents the flow of particulate substance out of the metering chamber (9) in the loading state, but admits the flow of particulate substance out of the metering chamber (9) in the emptying state; and
   a reservoir (30) leading to the inlet (6) of the inflow path, wherein the reservoir (30) is rotatable and configured so as in use to rotate together with and provide particulate substance to the inflow path;
   wherein that the reservoir (30) is further configured such that on rotation a tumbling effect is achieved at the inlet (6) of the inflow path for every volume of particulate substance containable therein.

2. The metering device as claimed in claim 1, wherein the obstructing means is a mechanical valve.

3. The metering device as claimed in claim 1, wherein the outflow path is rotatable about the rotational axis (4) and configured so as in use to rotate together with the inflow path and includes at least a part which is inclined relative to the rotational axis (4) so as to be inclined upwards in the loading state and downwards in the emptying state, whereby the outflow path provides a gravitational outlet lock which prevents the flow of particulate substance out of the metering chamber (9) in the loading state and guides a gravity-induced flow of particulate substance out of the metering chamber (9) in the emptying state.

4. The metering device as claimed in claim 1 or 3, wherein the metering chamber (9) has a variable internal volume.

5. The metering device as claimed in claim 4, further comprising volume control means (24, 26) for altering the internal volume of the metering chamber (9).

6. The metering device as claimed in claim 5, wherein the cross section of the flow paths is substantially unaffected by a state transition.

7. The metering device as claimed in claim 6, wherein the body member (2) includes the flow paths and the flow paths comprise a channel (10, 12, 14) which extends through the body member (2).

8. The metering device as claimed in claim 7, wherein the reservoir (30) is co-axial with the inlet (6) of the inflow path.

9. The metering device as claimed in claim 8, wherein a major section (32) of the inner surface of the reservoir (30) tapers inwardly towards the inlet (6) of the inflow path.

10. The metering device as claimed in claim 9, wherein the major section (32) of the inner surface of the reservoir (30) is substantially conical in shape.

11. The metering device as claimed in claim 10, wherein the device is capable of one-directional rotational movement.

12. The metering device as claimed in claim 10, wherein the device is capable of reciprocating rotational movement.

13. The metering device as claimed in claim 10, wherein the outlet (8) of the outflow path is located adjacent to the rotational axis (4), whereby the position of the outlet (8) in a horizontal plane is substantially unaffected by a state transition.

14. The metering device as claimed in claim 13, wherein the inlet (6) of the inflow path is located adjacent to the rotational axis (4), whereby the position of the inlet (6) in a horizontal plane is substantially unaffected by a state transition.

15. A method of metering a predetermined amount of a particulate substance, comprising the steps of:
    providing a metering device for metering a predetermined amount of a particulate substance, the metering device comprising a body member (2) defining a metering chamber (9), an inflow path having an inlet (6) and leading to the metering chamber (9), wherein the inflow path is unbroken, rotatable about an axis (4) inclined relative to the horizontal and includes a first part (10) which is co-axial with the rotational axis (4) and a second part (12) which is inclined relative to the rotational axis (4) so as to be inclined downwards in a loading state and upwards in an emptying state, and wherein there is an absence of obstructing means in the metering chamber, an outflow path having an outlet (8) and leading from the metering chamber (9) and a reservoir (30) leading to the inlet (6) of the inflow path, wherein the reservoir (30) is rotatable about the rotational axis (4) and configured so as in use to rotate together with and provide particulate substance to the inflow path;
    providing particulate substance into the reservoir (30);
    rotating the inflow path so as to incline the second part (12) thereof downwards and guide a gravity-induced flow of the particulate substance therethrough so as to fill the metering chamber (9);
    preventing a gravity-induced flow of the particulate substance out of the metering chamber (9) during the filling step;
    rotating the inflow path so as to incline the second part (12) thereof upwards and thereby provide a gravitational inlet lock which prevents the further flow of particulate substance into the metering chamber (9); and
    emptying the metering chamber (9) while particulate substance is prevented from flowing into the metering chamber (9);
    wherein the reservoir (30) is further configured such that on rotation a tumbling effect is achieved at the inlet (6) of the inflow path for every volume of particulate substance containable therein.

16. The metering device as claimed in claim 15, wherein the obstructing means is a mechanical valve.

17. The method as claimed in claim 15, wherein the step of providing particulate substance into the reservoir (30) comprises the step of feeding particulate substance into the reservoir (30) such as to maintain a predetermined level therein.

18. The method as claimed in claim 15 or 17 wherein the step of providing particulate substance into the reservoir (30) comprises the step of feeding particulate substance intermittently into the reservoir (30).

19. The method as claimed in claim 18, further comprising the step of determining the weight of a metered amount of the particulate substance metered from the metering chamber (9) in the emptying step, and, where necessary, altering the internal volume of the metering chamber (9) in response thereto.

20. A metering apparatus for metering a predetermined amount of a particulate substance, comprising at least one metering device (A, B) comprising a body member (2) defining a metering chamber (9), an inflow path having an inlet (6) and leading to the metering chamber (9), wherein the inflow path is unbroken, rotatable about an axis (54) inclined relative to the horizontal and includes a first part (10) which is rotatable about the rotational axis (54) and a second part (12) which is inclined relative to the rotational axis (54) so as to be inclined downwards in a loading state and upwards in an emptying state, whereby the inflow path in use guides a gravity-induced flow of particulate substance into the metering chamber (9) in the loading state and provides a gravitational inlet lock which prevents the flow of particulate substance into the metering chamber (9) in the emptying state, and an outflow path having an outlet (8) and including flow control means which prevents the flow of particulate substance out of the metering chamber (9) in the loading state, but admits the flow of particulate substance out of the metering chamber (9) in the emptying state; wherein the metering apparatus further comprises a rotatable wheel (50) having two or more metering devices (A, B) mounted thereon in circumferentially spaced positions with a common rotational axis (54).

21. The metering apparatus as claimed in claim 20, comprising at least two metering devices (A, B) disposed di&metrically opposite each other on the rotatable wheel (50) such that when one of the at least two metering devices (A, B) is in the loading state another is in the emptying state.

22. The metering apparatus as claimed in claim 20 or 21 wherein each metering device (A, B) comprises a valve mechanism for opening and closing the outlet (8) of the outflow path thereof, each valve mechanism comprising a valve member (70), which is movable between a closed position for closing the outlet (8) in the loading state and an open position for opening the outlet (8) in the emptying state, and a cam-type arrangement (72, 74) for mechanically operating the valve member (70) during rotation of the rotatable wheel (50).

* * * * *